(12) United States Patent
Hughes

(10) Patent No.: US 8,700,792 B2
(45) Date of Patent: Apr. 15, 2014

(54) METHOD AND APPARATUS FOR EXPEDITING DELIVERY OF PROGRAMMING CONTENT OVER A BROADBAND NETWORK

(75) Inventor: Gary Hughes, Chelmsford, MA (US)

(73) Assignee: General Instrument Corporation, Horsham, PA (US)

( * ) Notice: Subject to any disclaimer, the term of this patent is extended or adjusted under 35 U.S.C. 154(b) by 404 days.

(21) Appl. No.: 12/023,399

(22) Filed: Jan. 31, 2008

(65) Prior Publication Data

US 2009/0198827 A1  Aug. 6, 2009

(51) Int. Cl.
*G06F 15/16* (2006.01)
*H04N 7/173* (2011.01)

(52) U.S. Cl.
USPC ............................................ 709/231; 725/95

(58) Field of Classification Search
USPC .................................... 709/231; 725/86–104
See application file for complete search history.

(56) References Cited

U.S. PATENT DOCUMENTS

| | | |
|---|---|---|
| 5,361,091 A | 11/1994 | Hoarty et al. |
| 5,421,031 A | 5/1995 | De Bey |
| 5,528,282 A | 6/1996 | Voeten et al. |
| 5,532,748 A | 7/1996 | Naimpally |
| 5,633,683 A | 5/1997 | Rosengren et al. |
| 5,659,539 A | 8/1997 | Porter et al. |
| 5,682,597 A | 10/1997 | Ganek et al. |
| 5,684,799 A | 11/1997 | Bigham et al. |
| 5,686,965 A | 11/1997 | Auld |

(Continued)

FOREIGN PATENT DOCUMENTS

| | | |
|---|---|---|
| EP | 1294193 A1 | 3/2003 |
| EP | 1487215 A2 | 12/2004 |

(Continued)

OTHER PUBLICATIONS

PCT International Search Report, RE: PCT Application #PCT/US09/31953, Jan. 26, 2009.

(Continued)

*Primary Examiner* — Shirley Zhang
(74) *Attorney, Agent, or Firm* — Lori Anne D. Swanson

(57) ABSTRACT

A method is provided that is performed by a client device such a set top box when a viewer requests a program by initiating a channel change from a program guide or entering a channel through the user interface. The client device receives the user request and, in response, the client device transmits the request to the streaming server in the headend, which causes the streaming server to create a unicast catch up stream that commences with a key frame. The streaming server calculates the end point of the catch up stream and continues to send the catch up stream at a rate faster than real time. The client device receives the catch up stream and begins buffering it. While the catch up stream is being buffered the client device begins decoding and presenting the content. The client device receives the end of stream marker, and in response, sends a request to join the multicast stream. Once the client device starts receiving the multicast stream, the client device discards any remaining images or pictures in the catch up stream that precede the synchronization time. The client device also begins to buffer the multicast stream as it continues to play the buffered catch up stream. When it reaches the end of the catch up stream, the client device begins to play out the buffered multicast stream.

18 Claims, 4 Drawing Sheets

(56) References Cited

U.S. PATENT DOCUMENTS

| | | | |
|---|---|---|---|
| 5,701,582 A | 12/1997 | DeBey | |
| 5,719,632 A | 2/1998 | Hoang et al. | |
| 5,724,646 A | 3/1998 | Ganek et al. | |
| 5,732,217 A | 3/1998 | Emura | |
| 5,748,229 A | 5/1998 | Stoker | |
| 5,864,682 A | 1/1999 | Porter et al. | |
| 5,884,141 A | 3/1999 | Inoue et al. | |
| 5,909,224 A | 6/1999 | Fung | |
| 5,933,193 A | 8/1999 | Niesen | |
| 5,949,410 A | 9/1999 | Fung | |
| 6,112,226 A | 8/2000 | Weaver et al. | |
| 6,138,147 A | 10/2000 | Weaver et al. | |
| 6,181,334 B1 | 1/2001 | Freeman et al. | |
| 6,310,652 B1 | 10/2001 | Li et al. | |
| 6,317,459 B1 | 11/2001 | Wang | |
| 6,317,784 B1 | 11/2001 | Mackintosh et al. | |
| 6,334,217 B1 | 12/2001 | Kim | |
| 6,415,326 B1 | 7/2002 | Gupta et al. | |
| 6,480,539 B1 | 11/2002 | Ramaswamy | |
| 6,510,177 B1* | 1/2003 | De Bonet et al. | 375/240.16 |
| 6,519,011 B1 | 2/2003 | Shendar | |
| 6,519,693 B1 | 2/2003 | Debey | |
| 6,526,580 B2 | 2/2003 | Shimomura et al. | |
| 6,535,920 B1 | 3/2003 | Parry et al. | |
| 6,611,624 B1 | 8/2003 | Zhang et al. | |
| 6,637,031 B1 | 10/2003 | Chou | |
| 6,728,317 B1 | 4/2004 | Demos | |
| 6,745,715 B1 | 6/2004 | Shen et al. | |
| 6,771,644 B1 | 8/2004 | Brassil et al. | |
| 6,850,965 B2 | 2/2005 | Allen | |
| 6,870,887 B2 | 3/2005 | Kauffman et al. | |
| 6,985,570 B2 | 1/2006 | Hasemann | |
| 7,058,721 B1 | 6/2006 | Ellison et al. | |
| 7,096,481 B1 | 8/2006 | Forecast et al. | |
| 7,116,714 B2 | 10/2006 | Hannuksela | |
| 7,143,432 B1 | 11/2006 | Brooks et al. | |
| 7,149,410 B2 | 12/2006 | Lin et al. | |
| 7,164,714 B2 | 1/2007 | Martin | |
| 7,218,635 B2 | 5/2007 | Haddad | |
| 7,298,966 B2 | 11/2007 | Nakatani et al. | |
| 7,366,241 B2 | 4/2008 | Matsui | |
| 7,369,610 B2* | 5/2008 | Xu et al. | 375/240.08 |
| 7,430,222 B2 | 9/2008 | Green et al. | |
| 7,444,419 B2 | 10/2008 | Green | |
| 7,469,365 B2 | 12/2008 | Kawahara et al. | |
| 7,562,375 B2 | 7/2009 | Barrett et al. | |
| 7,587,737 B2 | 9/2009 | Baldwin et al. | |
| 7,636,934 B2 | 12/2009 | Baldwin et al. | |
| 7,720,432 B1 | 5/2010 | Colby et al. | |
| 7,788,393 B2 | 8/2010 | Pickens et al. | |
| 7,885,270 B2 | 2/2011 | Frink et al. | |
| 2002/0016961 A1 | 2/2002 | Goode | |
| 2002/0073402 A1 | 6/2002 | Sangavarapu et al. | |
| 2002/0147979 A1 | 10/2002 | Corson | |
| 2002/0166119 A1 | 11/2002 | Cristofalo | |
| 2002/0168012 A1 | 11/2002 | Ramaswamy | |
| 2002/0184637 A1 | 12/2002 | Perlman | |
| 2003/0012280 A1 | 1/2003 | Chan | |
| 2003/0053476 A1 | 3/2003 | Sorenson et al. | |
| 2003/0093543 A1 | 5/2003 | Cheung et al. | |
| 2003/0098869 A1 | 5/2003 | Arnold et al. | |
| 2003/0103613 A1 | 6/2003 | Hasemann | |
| 2003/0128765 A1 | 7/2003 | Yoshigahara | |
| 2003/0208768 A1 | 11/2003 | Urdang et al. | |
| 2004/0034863 A1 | 2/2004 | Barrett et al. | |
| 2004/0034864 A1 | 2/2004 | Barrett et al. | |
| 2004/0049793 A1 | 3/2004 | Chou | |
| 2004/0064497 A1 | 4/2004 | Debey | |
| 2004/0146205 A1 | 7/2004 | Becker et al. | |
| 2004/0160974 A1 | 8/2004 | Read et al. | |
| 2004/0223739 A1 | 11/2004 | Suzuki et al. | |
| 2004/0231004 A1 | 11/2004 | Seo | |
| 2004/0255328 A1 | 12/2004 | Baldwin et al. | |
| 2005/0039219 A1 | 2/2005 | Cooper et al. | |
| 2005/0055730 A1 | 3/2005 | Daniels | |
| 2005/0060755 A1 | 3/2005 | Daniels | |
| 2005/0060756 A1 | 3/2005 | Daniels | |
| 2005/0081244 A1* | 4/2005 | Barrett et al. | 725/97 |
| 2005/0089035 A1 | 4/2005 | Klemets et al. | |
| 2005/0097596 A1 | 5/2005 | Pedlow | |
| 2005/0099869 A1 | 5/2005 | Crinon et al. | |
| 2005/0120131 A1 | 6/2005 | Allen | |
| 2005/0135477 A1 | 6/2005 | Zhang et al. | |
| 2005/0174352 A1 | 8/2005 | Gabrani et al. | |
| 2005/0190781 A1* | 9/2005 | Green et al. | 370/432 |
| 2005/0210145 A1 | 9/2005 | Kim et al. | |
| 2005/0232587 A1 | 10/2005 | Strawn et al. | |
| 2005/0254649 A1* | 11/2005 | Demos | 380/205 |
| 2005/0262531 A1 | 11/2005 | Varma et al. | |
| 2005/0265374 A1 | 12/2005 | Pelt | |
| 2006/0018379 A1 | 1/2006 | Cooper | |
| 2006/0020995 A1 | 1/2006 | Opie et al. | |
| 2006/0075428 A1 | 4/2006 | Farmer et al. | |
| 2006/0075446 A1 | 4/2006 | Klemets et al. | |
| 2006/0075449 A1 | 4/2006 | Jagadeesan et al. | |
| 2006/0080724 A1 | 4/2006 | Vermeiren et al. | |
| 2006/0083263 A1 | 4/2006 | Jagadeesan et al. | |
| 2006/0117358 A1 | 6/2006 | Baldwin et al. | |
| 2006/0117359 A1 | 6/2006 | Baldwin et al. | |
| 2006/0126667 A1 | 6/2006 | Smith et al. | |
| 2006/0136581 A1 | 6/2006 | Smith | |
| 2006/0140276 A1 | 6/2006 | Boyce et al. | |
| 2006/0143669 A1 | 6/2006 | Cohen | |
| 2006/0182052 A1 | 8/2006 | Yoon et al. | |
| 2006/0184973 A1 | 8/2006 | de Heer et al. | |
| 2006/0218281 A1 | 9/2006 | Allen | |
| 2006/0224666 A1 | 10/2006 | Allen | |
| 2006/0224768 A1 | 10/2006 | Allen | |
| 2006/0242240 A1 | 10/2006 | Parker et al. | |
| 2006/0244936 A1 | 11/2006 | Ozawa | |
| 2006/0262985 A1 | 11/2006 | Chen et al. | |
| 2007/0009039 A1 | 1/2007 | Ryu | |
| 2007/0040818 A1 | 2/2007 | Aoyanagi et al. | |
| 2007/0107026 A1* | 5/2007 | Sherer et al. | 725/97 |
| 2007/0121629 A1 | 5/2007 | Cuijpers et al. | |
| 2007/0126853 A1 | 6/2007 | Ridge et al. | |
| 2007/0130596 A1 | 6/2007 | Wirick | |
| 2007/0133609 A1 | 6/2007 | Moore et al. | |
| 2007/0222728 A1 | 9/2007 | Koyama et al. | |
| 2007/0230564 A1 | 10/2007 | Chen et al. | |
| 2007/0266398 A1 | 11/2007 | Vandaele | |
| 2007/0280298 A1* | 12/2007 | Hearn et al. | 370/498 |
| 2007/0280354 A1 | 12/2007 | Park et al. | |
| 2008/0028275 A1 | 1/2008 | Chen et al. | |
| 2008/0109557 A1* | 5/2008 | Joshi et al. | 709/231 |
| 2008/0120553 A1 | 5/2008 | Bergman et al. | |
| 2008/0127258 A1 | 5/2008 | Walker et al. | |
| 2008/0273698 A1 | 11/2008 | Manders et al. | |
| 2009/0010273 A1 | 1/2009 | Green et al. | |
| 2009/0064242 A1 | 3/2009 | Cohen et al. | |
| 2009/0077255 A1* | 3/2009 | Smith et al. | 709/231 |
| 2009/0198827 A1 | 8/2009 | Hughes | |
| 2009/0245393 A1* | 10/2009 | Stein et al. | 375/240.28 |
| 2009/0307732 A1 | 12/2009 | Cohen et al. | |
| 2009/0322962 A1 | 12/2009 | Weeks | |
| 2011/0072463 A1 | 3/2011 | Zaslavsky et al. | |
| 2011/0162024 A1 | 6/2011 | Jagadeesan et al. | |
| 2011/0221959 A1 | 9/2011 | Ben Yehuda et al. | |

FOREIGN PATENT DOCUMENTS

| | | | |
|---|---|---|---|
| EP | 1523190 A1 | 4/2005 | |
| KR | 10-2006-0110104 A | 10/2006 | |
| WO | 2004114667 A1 | 12/2004 | |
| WO | 2004114668 A1 | 12/2004 | |
| WO | 2008044916 A2 | 4/2008 | |
| WO | 2009097230 A1 | 8/2009 | |
| WO | 2010014210 A1 | 2/2010 | |

OTHER PUBLICATIONS

Mark Oliver, Tutorial: The H.264 Scalable Video Codec (SVC), downloaded at: http://www.eetimes.com/design/signal-processing-

(56) References Cited

OTHER PUBLICATIONS dsp/4017613/Tutorial-The-H-264-Scalable-Video-Codec-SVC, dated Mar. 10, 2008, 5 pages.
EPC Extended Search Report, RE: Application #09706287.1-2223/2248342 PCT/US2009031953; Dec. 19, 2011.
American National Standard ANSI/SCTE 35 2004, "Digital Program Insertion Cueing Message for Cable," Society of Cable Telecommunications Engineers, Inc., Exton, PA, USA (www.scte.org).
Azad, S.A., et al., "A novel batched multicast patching scheme for video broadcasting with low user delay," Signal Processing and Information Technology, 2003. ISSPIT 2003. Proceedings of the 3rd IEEE International Symposium on Darmstadt, Germany, pp. 339-342 (2003).
Chiariglione, L., "Short MPEG-2 description," accessed at http://web.archive.org/web/20101010044824/http://mpeg.chiariglione.org/standards/mpeg-2/mpeg-2.htm, accessed on Dec. 20, 2012, pp. 4.
Hurst, N., and Cornog, K., "MPEG Splicing: A New Standard for Television—SMPTE312M," SMPTE Journal, vol. 107, No. 11, pp. 978-988, Society of Motion Picture and Television Engineers, Inc (1998).
Johns, W., "A Better TV Experience with Microsoft Mediaroom Instant Channel Change," Word Press Ops Vault (2010).
Poon, W-F., et al. "Batching policy for video-on-demand in multicast environment," Electronics Letters, IEEE ,vol. 36, No. 15, pp. 1329-1330 (2000).
Rajah, R., "Optimizing Channel Change Time," Cisco Systems, Inc., pp. 1-22 (2008).
Schulzrinne, H., et al., "Real-Time Streaming Protocol (RTSP)," Request for Comments RFC2326, Network Working Group, pp. 1-92, The Internet Society (1998).
Wave 7 Optics, Inc., "Channel Change Speed in IPTV Systems," White Paper, dated Jun. 3, 2004.
Wee, S.J., and Vasudev, B., "Splicing MPEG Video Streams in the Compressed Domain," IEEE Workshop on Multimedia Signal Processing, pp. 225-230 (1997).
Zhu, X., et al., "Video Multicast over Wireless Mesh Networks with Scalable Video Coding (SVC)," Visual Communications And Image Processing, Proceedings of the SPIE, vol. 6822, pp. 682205-682205-8 (2008).

* cited by examiner

METHOD AND APPARATUS FOR EXPEDITING DELIVERY OF PROGRAMMING CONTENT OVER A BROADBAND NETWORK

FIELD OF THE INVENTION

The present invention relates generally to a method and apparatus for streaming programming content over a broadband network and more particularly to a method and apparatus for streaming programming content to a client device so that there is a minimal delay between the time the client device requests the programming content and the time the programming content can be displayed or otherwise rendered.

BACKGROUND OF THE INVENTION

A television may access programming content through a variety of transmission technologies such as cable, satellite, or over the air, in the form of analog or digital signals. Such programming may be delivered in accordance with a number of media delivery models including broadcast, multicast and narrowcast models. In addition to the aforementioned technologies, the Internet is emerging as a television content transmission medium. Television that receives content through an Internet network connection via the Internet Protocol (IP) may be generically referred to as IPTV. The Internet network may be the public Internet, a private network operating in accordance with the Internet Protocol, or a combination thereof. IPTV has become a common denominator for systems in which television and/or video signals are distributed to subscribers over a broadband connection using the Internet protocol. In general, IPTV systems utilize a digital broadcast signal that is sent by way of a broadband connection and a set top box ("STB") that is programmed with software that can handle subscriber requests to access media sources via a television connected to the STB. A decoder in the STB handles the task of decoding received IP video signals and converting them to standard television signals for display on the television. Where adequate bandwidth exists, IPTV is capable of a rich suite of services compared to cable television or the standard over-the-air distribution.

In traditional cable television or over-the-air distribution a user can quickly change channels, resulting in the virtual instantaneous transition from one program to another. And as such, the user does not typically perceive a delay in the presentation of a new program upon tuning to a new program. However, this simple manner of operation does not apply to the delivery of IPTV. In this environment, the client module typically must store a prescribed amount of media information in a buffer before it begins to play the media information to the user. It requires a certain amount of time to fill up this buffer when the user first connects to a stream of media information. Further, digital media information is commonly expressed as a series of key frames (e.g., I frames) and difference frames (e.g., B and P frames). A client module must wait for a key frame before it begins to present the media information. As a result of these factors, there will be a noticeable lag prior to the presentation of programs as the user switches from one channel to the next. This lag may last as long as several seconds, which is an unacceptably long delay in comparison to traditional cable or over-the-air distribution, which typically requires less than one frame time of about 33 msec to switch analog channels and less than about half a second for digital broadcast channels.

SUMMARY

In accordance with one example of the invention, a method is provided that is performed by a client device such a set top box when a viewer requests a program by initiating a channel change from a program guide or entering a channel through the user interface. In this example the client device receives the user request and, in response, the client device transmits the request to the streaming server in the headend, which causes the streaming server to create a unicast catch up stream that commences with a key frame. The streaming server calculates the end point of the catch up stream and continues to send the catch up stream at a rate faster than real time. The client device receives the catch up stream and begins buffering it. While the catch up stream is being buffered the client device begins decoding and presenting the content. The client device receives the end of stream marker, and in response, sends a request to join the multicast stream. Once the client device starts receiving the multicast stream, the client device discards any remaining images or pictures in the catch up stream that precede the synchronization time. The client device also begins to buffer the multicast stream as it continues to play the buffered catch up stream. When it reaches the end of the catch up stream, the client device begins to play out the buffered multicast stream. Because the catch up and multicast stream share a common time base and GOP structure this transition is seamless to the viewer other than an increase in picture quality.

In accordance with another example of the invention, a headend is provided for a broadband network. The headend includes a scalable encoder for receiving programming content and generating a scalably encoded programming stream therefrom. The scalably encoded programming stream including a base layer and an enhancement layer. The headend also includes a streaming server for receiving the scalably encoded programming stream. The streaming server, responsive to a user request for the programming content, is configured to output for transmission over the broadband network a catch up bit stream at a bit rate at which the scalably encoded programming stream is encoded. The catch up stream includes the base layer but not the enhancement layer.

In accordance with yet another example of the invention, a set top box, is provided. The set top box includes a user interface for requesting a selected program for receipt over a broadband network. The set top box also includes a front-end for receiving at a target bit rate over the broadband network an initial portion and a remaining portion of the selected program. The initial portion is arranged as a unicast stream that includes a reduced bit rate representation of the requested program. The reduced bit rate representation is encoded at a reduced bit rate relative to a normal representation of the requested programming that is encoded for transmission over the broadband network at the target bit rate. The set to box also includes a buffer for buffering at least the unicast stream, a decoder for decoding the unicast stream received from the buffer at the target bit rate, and a processor operatively associated with the user interface, the front-end, the buffer and the decoder.

DETAILED DESCRIPTION

Figure 1:
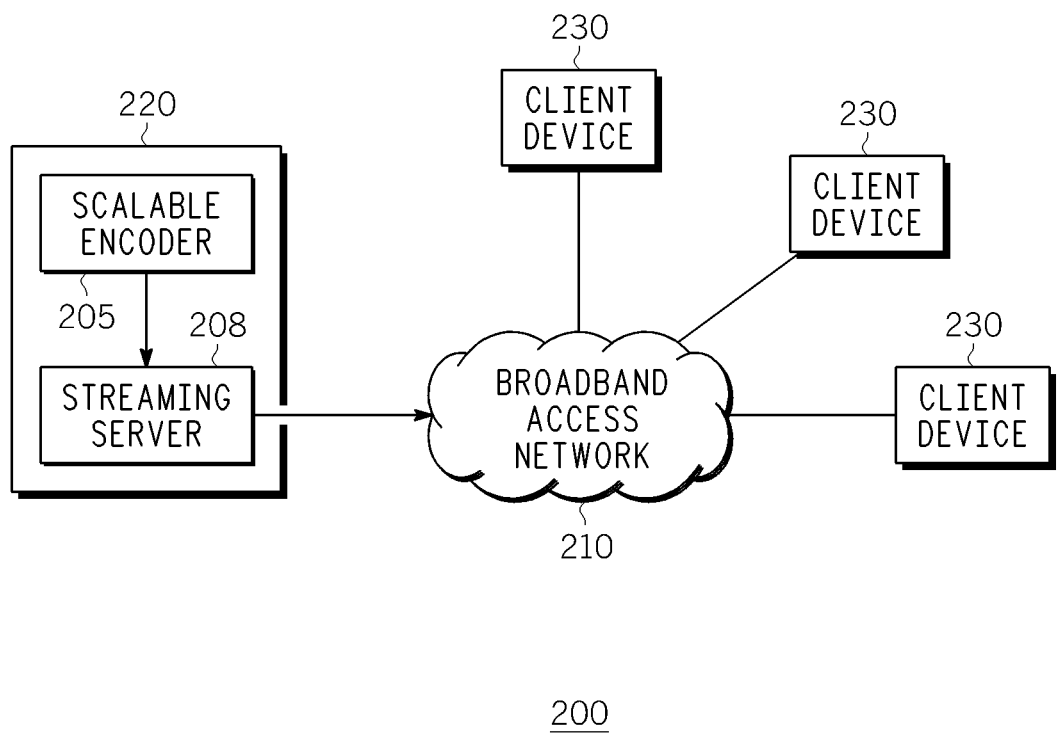
FIG. 1 shows the architecture of one example of a communication system that can be used to deliver video and other content and services to subscribers in a packet switched manner using an IP or other network-level protocol.

FIG. 1 shows the architecture of one example of a communication system 200 that can be used to deliver video and other content and services to subscribers in a packet switched manner using an IP or other network-level protocol. Communications system 200 is representative of a network architecture in which subscribers associated with client devices 230 (e.g., PCs, PDAs, portable computers, media centers, portable media players, mobile telephones and set-top boxes) are in communication with a broadband access network 210 such as an HFC network, for example. A headend 220 is in communication with the client devices 230 over the broadband access network 210. The headend 220 is the facility from which a network operator broadcasts/multicasts/unicasts programming content and provides other services over the network. As detailed below, the headend 220 may include a streaming server 208 for broadcasting/multicasting/unicasting the programming content that is encoded by a scalable encoder 205. The Broadband access network 210 and headend 220 are typically provided by an MSO (Multi-Service Operator). The broadband access network 210 is also referred to herein as a cable data network. Broadband access network 210 is typically an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed.

Broadband access network 210 may employ any suitable network-level protocols to provide communication among the various networked devices. While the IP protocol suite is used in the particular implementations described herein, other standard and/or proprietary communication protocols are suitable substitutes. For example, X.25, ARP, RIP, UPnP or other protocols may be appropriate in particular installations.

Broadband access network 210 includes all routers, switches, long haul and metropolitan transport, and access systems necessary for transporting the video streams and the associated management and license data. Thus, network 210 supports transport of video-on-IP unicast and multicast content, and could be IP router and switch based, where IP multicast replication is accomplished by core and edge routers.

For large amounts of data to be distributed to a large number of subscribers over a packet switched network, IP (or other network-level) multicasting is more efficient than normal Internet transmissions because a server can broadcast data/messages to many recipients simultaneously. Unlike traditional Internet traffic that requires separate connections (single-cast addressing) for each source—destination pair, IP multicasting allows many recipients to share the same source. This means that just one set of packets is transmitted for all destinations. To receive a multicast, a subscriber listens to a specific IP address on a multicast-enabled network, like tuning a television to a specific channel. Multicast broadcast is particularly suitable for distribution of multimedia (video, audio, data) content. When the IP suite is employed, the content is generally transmitted as an MPEG packet stream on a pre-established UDP port and the MPEG packets are encapsulated in UDP/IP datagrams.

Internet Group Management Protocol (IGMP) is defined in RFC 1112 as the Internet standard for IP multicasting. IGMP establishes host memberships in particular multicast groups on a single network and allows a host (e.g., client device 230) to inform its local router using a multicast join request that it wants to receive data addressed to a specific multicast group. The edge routers of network 210 are provided with IGMP (Internet Group Management Protocol) to enable IGMP switching for IP Multicasts, Broadcast Television and the special IP multicast information. QoS for subscriber services is implemented using IP queuing in the edge router. For example, highest priority may be given to Video on Demand and Broadcast Video while lower priority is given to High Speed Internet. The edge routers may also be enabled with static routing of the most popular broadcast channels to improve channel change times.

When changing channels in an IPTV environment using a multicast join request, there is generally a perceptible delay of up to several seconds between the time at which the channel is changed and the time when the content can be decoded and displayed by the client device. This delay arises from the time required to join the appropriate multicast stream and the time required to receive a key frame such as an I frame. This problem can be overcome by first creating a short-lived transport stream that uses a reduced bit rate representation of the content sent at an accelerated pace that allows the client device to immediately begin decoding and displaying the content. The short-lived transport stream, also referred to herein as a catch up stream, is unicast to the client device. The client device uses the unicast catch up stream until it catches up with the multicast stream at some time after the client device has joined the multicast stream. At that time the catch up stream terminates and the client device begins decoding and displaying the content from the multicast stream. The catch up stream is constrained to use no more bandwidth than the multicast stream and in many cases will use the same bandwidth as the multicast stream.

In some cases both the catch up stream and the multicast stream can be made available to the streaming server 208 in headend 220 in a common transport stream using, for example, scalable coding techniques. That is, scalable coding techniques can be used to create the catch up stream from a single instance of the content. Scalable coding generates multiple layers, for example a base layer and an enhancement layer, for the encoding of video data. The base layer typically has a lower bit rate and lower spatial resolution and quality, while the enhancement layer increases the spatial resolution and quality of the base layer, thus requiring a higher bit rate. The enhancement layer bitstream is only decodable in conjunction with the base layer, i.e. it contains references to the decoded base layer video data which are used to generate the final decoded video data.

Scalable encoding has been accepted for incorporation into established standards, including the ITU-T.H.264 standard and its counterpart, ISO/IEC MPEG-4, Part 10, i.e., Advanced Video Coding (AVC). More specifically, the scalable encoding recommendations that are to be incorporated into the standards may be found in ITU-T Rec. H.264|ISO/IEC 14496-10/Amd.3 Scalable video coding 2007/11, currently published as document JVT-X201 of the Joint Video Team (JVT) of ISO/IEC MPEG & ITU-T VCEG (ISO/IEC JTC1/SC29/WG11 and ITU-T SG16 Q.6). In some cases the catch up and the multicast stream may operate in accordance with these standards and recommendations, although other scalable encoding syntaxes and techniques may be used as well.

The target bit rate $R_t$ that is needed to encode the normal multicast stream, which includes the base layer and the enhancement layer, is:

$$R_t = R_{vbase} + R_{venh} + R_{audio} + R_{sys}$$

where $R_{vbase}$ is the base video layer, $R_{venh}$ is the enhancement video layer, $R_{audio}$ is the audio channel(S) and $R_{sys}$ is any necessary system overhead.

For the catch up stream, the catch up bit rate $R_c$ only uses the video base layer in conjunction with the audio and system overhead.

$$R_c = R_{vbase} + R_{audio} + R_{sys}$$

The relationship between the target bit rate and the catch up bit rate can be expressed as the Catch Up Ratio, calculated as:

$$CR = \frac{R_t}{R_t - R_c}.$$

If the catch up stream is transmitted at the target bit rate $R_t$ instead of the catch up bit rate $R_c$, the catch up ratio can be used with the key frame interval $I_k$ (i.e., the time between successive key frames) to determine how long the unicast catch up stream needs to operate before it reaches temporal synchronization with the multicast stream. In this case the duration $T_{catchup}$ of the catch up stream is:

$$T_{catchup} = CR * I_k$$

The Catch Up Ratio that is selected will require a tradeoff among a number of factors, including: the acceptable video quality of the catch up stream; the time delay between the channel change event and coincidence between the catch up and multicast streams; and the buffering capacity in the set top decoder.

Figure 2:
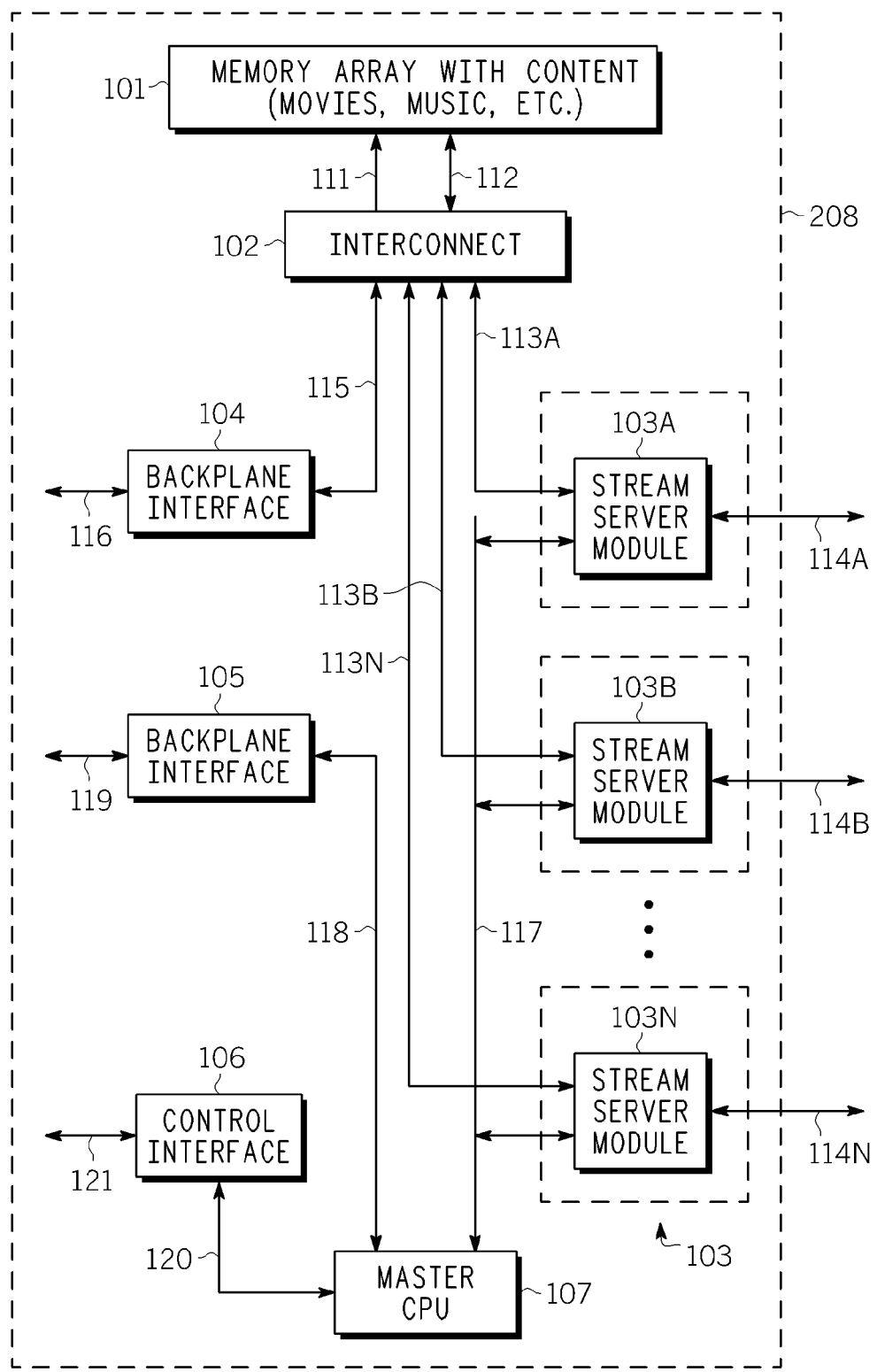
FIG. 2 shows a block diagram of one example of the streaming server shown in FIG. 1.

One example of the streaming server 208 shown in FIG. 1 that may be used in the headend 220 to ingest and transmit both the unicast stream and the multicast steam is shown in FIG. 2. This DRAM-based server allows a very large number of channel change requests to be simultaneously accommodated using a single representation of the content.

The streaming server 208 includes a memory array 101, an interconnect device 102, and stream server modules 103a through 103n (103). Memory array 101 is used to store the on-demand content and could be many Gigabytes or Terabytes in size. Such memory arrays may be built from conventional memory solid state memory including, but not limited to, dynamic random access memory (DRAM) and synchronous DRAM (SDRAM). The stream server modules 103 retrieve the content from the memory array 101 and generate multiple asynchronous streams of data that can be transmitted to the client devices 230. The interconnect 102 controls the transfer of data between the memory array 101 and the stream server modules 103. The interconnect 102 also establishes priority among the stream server modules 103, determining the order in which the stream server modules receive data from the memory array 101.

The communication process starts with a channel change request being sent from a client device 230 over broadband access network 210. The command for the request arrives over a signal line 114a-114n (114) to a stream server module 103, where the protocol information is decoded. If the request comes in from stream server module 103a, for example, it travels over a bus 117 to a master CPU 107. For local configuration and status updates, the CPU 107 is also connected to a local control interface 106 over signal line 120, which communicates with the system operator over a line 121. Typically this could be a terminal or local computer using a serial connection or network connection.

Control functions, or non-streaming payloads, are handled by the master CPU 107. Program instructions in the master CPU 107 determine the location of the desired content or program material in memory array 101. The memory array 101 is a large scale memory buffer that can store video, audio and other information. In particular, memory array 101 stores scalably encoded content of the type described above. In this manner, the streaming server 208 can provide a variety of content to multiple customer devices simultaneously. Each customer device can receive the same content or different content. The content provided to each customer is transmitted as a unique asynchronous media stream of data that may or may not coincide in time with the unique asynchronous media streams sent to other customer devices.

The amount of memory (in bits) needed in memory array 101 for buffering a portion of a program being received by the backplane interface 104 which is sufficient to generate the catch up stream is:

$$\text{Buffer Size} = (CR+1) * I_k * R_t$$

If the requested content is not already resident in the memory array 101, a request to load the program is issued over signal line 118, through a backplane interface 105 and over a signal line 119. An external processor or CPU (not shown) responds to the request by loading the requested program content over a backplane line 116, under the control of backplane interface 104. Backplane interface 104 is connected to the memory array 101 through the interconnect 102. This allows the memory array 101 to be shared by the stream server modules 103, as well as the backplane interface 104. The program content is written from the backplane interface 104, sent over signal line 115, through interconnect 102, over signal line 112, and finally to the memory array 101.

When the first block of program material has been loaded into memory array 101, the streaming output can begin. Data playback is controlled by a selected one or more stream server modules 103. If the stream server module 103a is selected, for example, the stream server module 103a sends read requests over signal line 113a, through the interconnect 102, over a signal line 111 to the memory array 101. The CPU 107 informs the stream server module 103a of the actual location of the program material in the memory array. With this information, the stream server module 103a can immediately begin requesting the program stream from memory array 101.

A block of data is read from the memory array 101, sent over signal line 112, through the interconnect 102, and over signal line 113a to the stream server module 103a. Once the block of data has arrived at the stream server module 103a, the transport protocol stack is generated for this block and the resulting primary media stream is sent to the broadband access network 210 over signal line 114a. This process is repeated for each data block contained in the program source material.

When a scalably encoded program stream is received by the streaming server 208 over the backplane interface 104 the master CPU 107 examines the incoming stream to determine the packet ID (PID) types, the location of key frames, bit rate and other pertinent information. In particular, the master CPU 107 distinguishes between the PIDs assigned to packets that carry the base layer and the PIDs assigned to packets that carry the enhancement layer. In this way when one of the stream server modules 103 is generating a catch up steam from the data received from the memory array 101 it can drop the packets having a PID assigned to the enhancement layer.

The master CPU 107 also determines if there are any padding packets (which are assigned a null PID) in the incoming program stream, which are used to maintain timing information. The master CPU 107 calculates what proportion of the padding packets will be included in the catch up stream for the purpose of maintaining a constant catch up ratio. The dropped padding packets will generally be those associated with the enhancement layer, although in some cases additional padding packets may be dropped. The padding packets not used in the catch up stream are assigned to a different PID. During normal playout of the multicast stream using both the base and enhancement layers the stream server modules 103 remaps the padding packets that have been reassigned back to the null PID.

During the time period when the catch up stream is being provided to a client device 230 by the streaming server 208, the stream server module 103 examines the PIDS of the packets in the program stream and drops those packets belonging to the video enhancement layer and the padding packets that have been selected to be dropped. After the appropriate packets are dropped the stream server module 103 streams the catch up stream to the client device at the normal target bit rate $R_t$. In addition, the stream server module 103 replaces the existing program map table (PMT) with a new PMT that excludes the packets associated with the video enhancement layer. The PMT is included with the catch up stream and describes the elementary streams that compose the catch up stream by identifying the PIDs for each stream. The stream server module 103 may also include a marker packet in the catch up stream to indicate the end of the catch up stream.

In some cases the marker packet may be an end of stream packet as described in ISO Joint Video Team (JVT) document JVT-Y083, for example.

Figure 3:
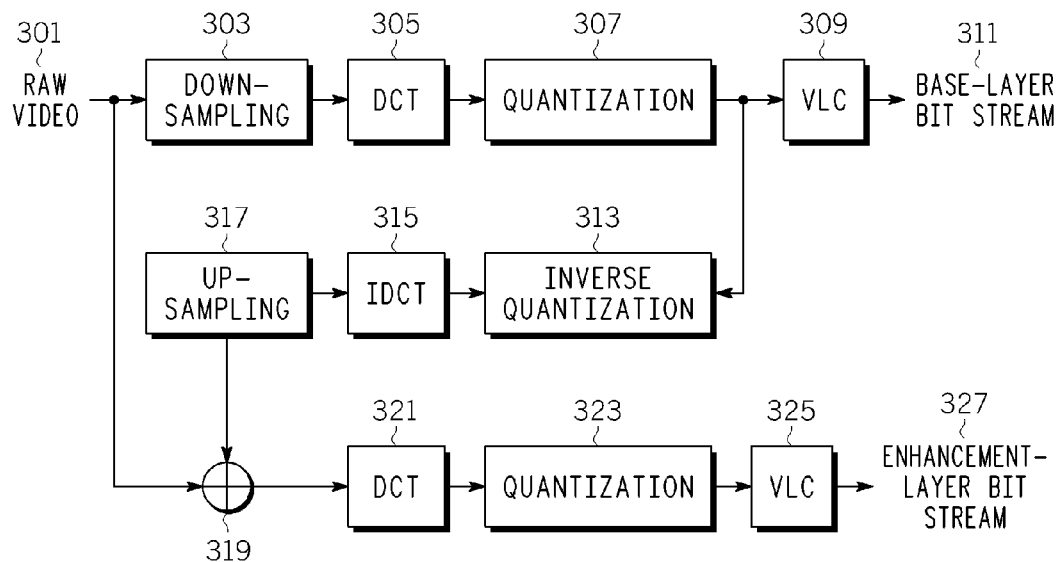
FIG. 3 shows a block diagram of one example of the spatial encoder shown in FIG. 1.

FIG. 3 shows a block diagram of one example of the spatial encoder 205 that supplies the scalably encoded program stream to the streaming server 208 shown in FIG. 1. The encoder 205 encodes a raw video 301 using a low resolution base-layer and an enhancement layer in which video that has been spatially up-sampled from the base layer is subtracted from the raw video 301 and encoded to form a residual image. The encoder includes a down-sampling module 303, discrete cosine transform (DCT) module 305, quantization module 307, and variable-length-coding (VLC) module 309, which are used to generate a base-layer bit stream 311 from the raw video bit stream 301. Specifically, the raw video 301 is spatially down-sampled. Then, a discrete cosine transformation is performed on the down-sampled raw video 301 to obtain spatial redundancy from the input images. The discrete cosine transformed raw video 301 is quantized to remove a high-frequency region therefrom. The quantized video is encoded by VLC module 309, using, for example, such as Huffman coding, to generate the base-layer bit stream 311.

The enhancement-layer bit stream 327 is generated as follows. The raw video 301 is down-sampled, DCT transformed, and quantized as described above. The quantized video is reconstructed by inverse quantization module 313 and inverse discrete cosine transform (IDCT) module 315. Then, up-sampling is performed by up-sampling module 317 on the IDCT transformed video. The up-sampled video is subtracted from the raw video 301, and a discrete cosine transformation is performed by DCT module 321 on a residual image which is obtained after subtraction in summing unit 319. The DCT transformed residual image is quantized using a quantization parameter, which is smaller than the quantization parameter used on the quantization module 323. The quantized bits are encoded by VLC module 325 to generate the enhancement layer bit stream 327. The base layer bit stream 311 and the enhancement layer bit stream 327 are then combined into a single bit stream that is forwarded to the streaming server 208.

In some cases, for the base-layer encoding, motion estimation may be performed between the down-sampling module 303 and the DCT module 305, and motion compensation may be performed between the IDCT module 315 and the up-sampling module 317. Likewise, for the enhancement-layer encoding, motion estimation may be performed between the summing unit 319 and the DCT module 321.

Figure 4:
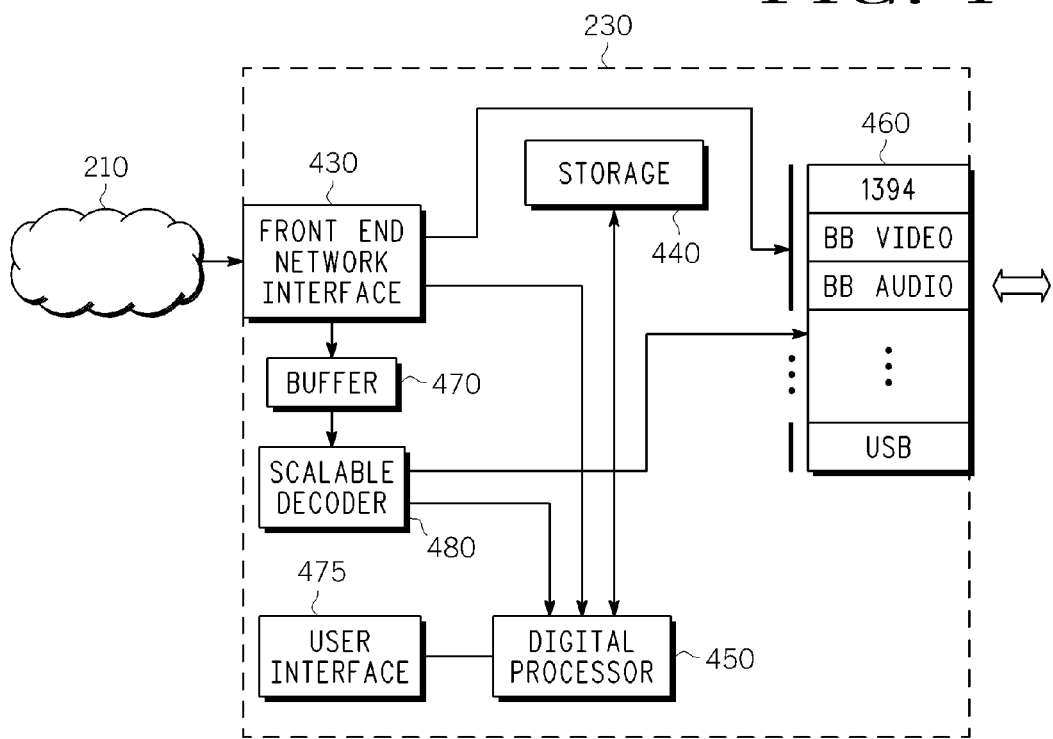
FIG. 4 shows a block diagram of one example of a client device such as a set top box.

FIG. 4 shows one example of a client device 230, which may be, for example, a set top box. The device 230 generally includes a front end 430 (e.g., a network interface such as an Ethernet interface) for interfacing with the IP or other broadband access network 210 of FIG. 1, digital processor(s) 450, a buffer 470 for buffering the incoming unicast and catch up streams, a scalable decoder 480 for decoding the program stream, a storage device 440, a user interface 475 and a plurality of interfaces 460 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include RF tuner and decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

The buffer 470 should be sufficiently large to at least buffer the catch up stream. Accordingly, the minimum buffer size is $$Buffer_{CD} = CR * I_k * R_t$$

The buffer 470 receives the catch up bit stream from the front end network interface 430 and paces it out to the scalable decoder 480 at a rate based on a time base such as the Program Clock Reference (PCR) which is included with the bit stream. The buffer 470 may also be used to perform PCR-based dejittering so that the received PCRs accurately reflects the original time base of the program. If the buffer 470 is used to dejitter its capacity needs to be the larger of the catch up buffer size specified above and the dejitter capacity. The processor 450 can be used to recognize an end of stream marker (if employed) and initiate a multicast join request to receive the multicast stream.

In the implementations described above the catch up stream and the normal multicast stream are both provided to the streaming server 208 in a single scalably encoded program stream. In other implementation, however, the catch up stream and the normal multicast stream are provided to the streaming server 208 as two separate streams in parallel with one another. While the two streams may be independent of one another, to simplify processing they may be constrained so that they have identical Group of Pictures (GOP) structures and timestamps to facilitate switching between catch up and live streams. Alternatively, if their timestamps are not the same, the streaming server 208 could be used to recognize that the streams are related and adjust the time stamps on the catch up stream, assuming that their GOP structures still match. In any case, both streams would be buffered in the memory array 101 of the streaming server 208 with the same buffer requirements described above, but replicated for each copy. During the catch up process when a client device first requests a program, the catch up stream would be unicast to the client devices at the target bit rate of the normal multicast stream in the manner described above. The client device would not require a scalable decoder, but would use its standard decoders to decode both the unicast and the multicast streams, typically in accordance with either MPEG-2 or H.264.

In yet another implementation the catch up stream may be generated from a previously encoded stream that is fed through a rate shaper or "smart transcoder." A smart transcoder uses the existing GOP structure and motion vectors to perform a rapid bit rate reduction without decoding and re-encoding the content. The resulting catch up stream would have the same GOP structure as the normal multicast stream.

Figure 5:
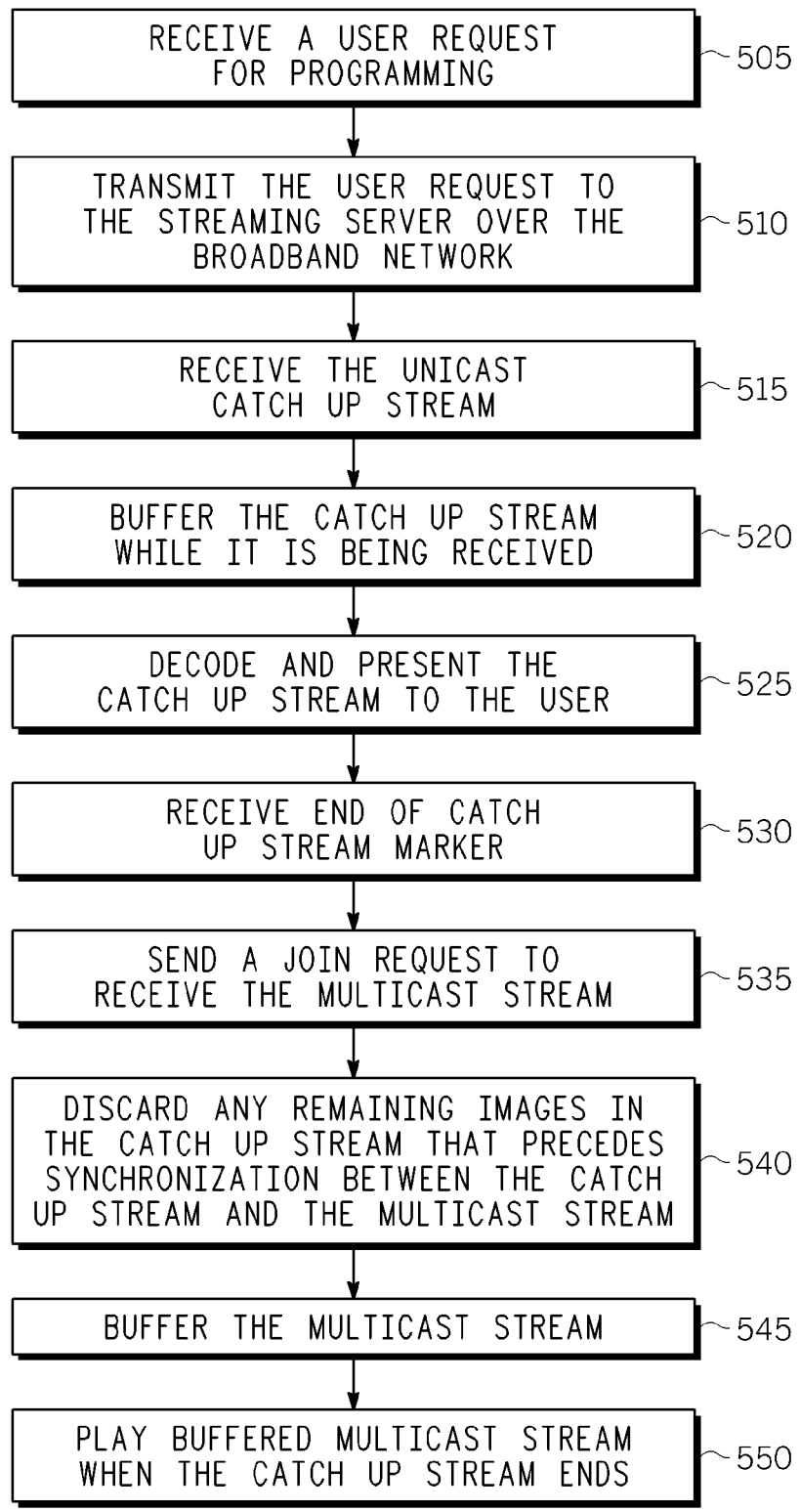
FIG. 5 is a flowchart showing one example of a process performed by a client device when a viewer requests a program by initiating a channel change from a program guide or entering a channel through the user interface.

FIG. 5 is a flowchart showing one example of a process performed by a client device when a viewer requests a program by initiating a channel change from a program guide or entering a channel through the user interface. In step 505 the client device receives the user request. In step 510 the client device transmits the request to the streaming server in the headend, which causes the streaming server to create a unicast catch up stream that commences with a key frame. The streaming server calculates the end point of the catch up stream and continues to send the catch up stream at a rate faster than real time. The client device receives the catch up stream in step 515 and begins buffering it in step 520. While the catch up stream is being buffered the client device begins decoding and presenting the content in step 525. In step 530 the client device receives the end of stream marker, and in response, sends a request to join the multicast stream in step 535. Once the client device starts receiving the multicast stream, the client device discards any remaining images or pictures in the catch up stream that precede the synchronization time in step 540. In step 545 the client device also begins to buffer the multicast stream as it continues to play the buffered catch up stream. When it reaches the end of the catch up stream, the client device begins to play out the buffered multicast stream in step 550. Because the catch up and multicast stream share a common time base and GOP structure this transition is seamless to the viewer other than an increase in picture quality.

The processes described above, including but not limited to those shown in FIG. 5, may be implemented in a general, multi-purpose or single purpose processor. Such a processor will execute instructions, either at the assembly, compiled or machine-level, to perform that process. Those instructions can be written by one of ordinary skill in the art following the description of FIG. 5 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for streaming programming content to a client device so that there is a minimal delay between the time the client device requests the programming content and the time the programming content can be displayed or otherwise rendered. This is accomplished by transmitting to the client device a reduced bit rate representation of the requested programming as a unicast stream while the client device awaits receipt of the higher bit rate multicast stream.

The invention claimed is:

1. A method to expedite delivery of programming to a user over a broadband network, the method comprising:
receiving a scalably encoded programming stream including a base layer and an enhancement layer;
receiving from the user a request for programming over the broadband network;
in response to the request, transmitting to the user over the broadband network a unicast stream in parallel to a corresponding multicast stream that includes the scalably encoded programming stream, wherein the unicast stream includes the base layer but not the enhancement layer, further wherein the base layer defines a reduced bit rate representation of the requested programming, wherein the reduced bit rate representation is encoded at a reduced bit rate and a lower spatial resolution rate relative to a normal representation of the requested programming that is encoded for transmission over the broadband network at a target bit rate wherein the unicast stream is transmitted at a rate faster than that of the multicast stream,
wherein the enhancement layer is only decodable in conjunction with the base layer and contains references to the base layer to thereby generate the normal representation of the requested programming, said normal representation having an increased spatial resolution relative to the reduced bit rate representation of the base layer; and
terminating transmission of the unicast stream at a time arising not before (i) the normal representation is multicast over the broadband network as a multicast stream and (ii) the unicast stream and the multicast stream are received by the user in temporal synchronization with one another.

2. The method of claim 1 wherein a duration T of the unicast stream is equal to $T=CR*I_k$, where $$CR = \frac{R_t}{R_t - R_c},$$

$R_t$ is the target bit rate, $R_c$ is the reduced bit rate and $I_k$ is equal to a time interval between successive key frames in the multicast stream.

3. The method of claim 2 wherein the key frames are I frames.

4. The method of claim 1 wherein the unicast stream is forwarded at a bit rate at which the normal representation of the requested programming is encoded.

5. The method of claim 1 further comprising receiving in parallel the unicast stream and the multicast stream as two separate program streams.

6. The method of claim 5 wherein the unicast and multicast streams share a common time base.

7. The method of claim 1 further comprising: identifying a Packet ID (PID) assigned to packets associated with the base layer and a PID assigned to packets associated with the enhancement layer; and dropping the packets associated with the enhancement layer to generate the reduced bit rate representation of the required programming.

8. The method of claim 7 further comprising dropping padding packets associated with the enhancement layer before generating the reduced bit rate representation of the requested programming.

9. The method of claim 8 further comprising assigning a new PID value to the dropped padding packets before they are dropped, and reassigning an original PID value to the dropped padding packets prior to inclusion of the dropped padding packets in the multicast stream.

10. The method of claim 1 further comprising generating a marker packet for inclusion with the unicast stream, wherein the marker packet denotes an end of a stream point.

11. An apparatus for a broadband network, comprising:
a scalable encoder for receiving programming content and generating a scalably encoded programming stream therefrom, the scalably encoded programming stream including a base layer and an enhancement layer, the base layer defining a reduced bit rate representation of the programming content, said reduced bit rate representation having a lower spatial resolution relative to a normal representation, wherein the enhancement layer is only decodable in conjunction with the base layer and contains references to the base layer to thereby generate the normal representation, said normal representation having an increased spatial resolution relative to the reduced bit rate representation of the base layer; and
a streaming server for receiving the scalably encoded programming stream, wherein the streaming server, responsive to a user request for the programming content, is configured to output for transmission over the broadband network a catch up bit stream, having a key frame, at a bit rate at which the scalably encoded programming stream is encoded, wherein the catch up bit stream includes the base layer but not the enhancement layer,
wherein the streaming server is further configured to terminate transmission of the catch up bit stream at a time arising not before (i) the normal representation is multicast over the broadband network as a multicast stream and (ii) the catch up bit stream and the multicast stream are received by a user in temporal synchronization with one another.

12. The apparatus of claim 11 wherein the streaming server is further configured to unicast the catch up bit stream to the user.

13. The apparatus of claim 11 wherein the streaming server is further configured to multicast the scalably encoded programming stream, including both the base layer and enhancement layer, over the broadband network.

14. The apparatus of claim 11 wherein the streaming server is further configured to identify packets associated with the base layer and packets associated with the enhancement layer and to drop the packets associated with the enhancement layer to generate the catch up bit stream.

15. A device, comprising:
a user interface for requesting a selected program for receipt over a broadband network, wherein the selected program is received as a scalably encoded programming stream including a base layer and an enhancement layer;
a front-end for receiving at a target bit rate over the broadband network an initial portion and a remaining portion of the selected program, the initial portion being arranged as a unicast stream, wherein the unicast stream includes the base layer but not the enhancement layer, further wherein the base layer defines a reduced bit rate representation of the selected program, wherein the reduced bit rate representation is encoded at a reduced bit rate and a lower spatial resolution relative to a normal representation of the requested programming that is encoded for transmission over the broadband network at the target bit rate,
wherein receiving of the unicast stream is terminated at a time arising not before (i) the normal representation is received as a multicast stream over the broadband network and (ii) the unicast stream and the multicast stream are received in temporal synchronization with one another,
wherein the enhancement layer is only decodable in conjunction with the base layer and contains references to the base layer to thereby generate the normal representation of the requested programming, said normal representation having an increased spatial resolution relative to the reduced bit rate representation of the base layer;
a buffer for buffering at least the unicast stream;
a decoder for decoding the unicast stream received from the buffer at the target bit rate; and
a processor operatively associated with the user interface, the front-end, the buffer and the decoder.

16. The device of claim 15 wherein the decoder is a scalable decoder.

17. The device of claim 15 wherein the processor is configured to send a multicast join request to receive the remaining portion of the selected program as a multicast stream.

18. The device of claim 15 wherein the processor is configured to send a multicast join request when an end of stream marker packet is detected indicating an end point of the initial portion of the selected program.

* * * * *